United States Patent
Badescu et al.

(10) Patent No.: US 8,979,020 B2
(45) Date of Patent: Mar. 17, 2015

(54) MOUNTING SYSTEM FOR MOUNTING ENGINE NACELLE COMPONENTS AND ASSOCIATED METHOD

(71) Applicant: Pratt & Whitney Canada Corp., Longueuil (CA)

(72) Inventors: Ovidiu Badescu, Val d'Or (CA); Antonio Pizzi, Ile des Soeurs (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 92 days.

(21) Appl. No.: 13/912,609

(22) Filed: Jun. 7, 2013

(65) Prior Publication Data

US 2014/0361119 A1    Dec. 11, 2014

(51) Int. Cl.
*B64D 27/00* (2006.01)
*B64D 27/26* (2006.01)

(52) U.S. Cl.
CPC ........................................ *B64D 27/26* (2013.01)
USPC ............... 244/54; 244/53 R; 60/796; 248/557

(58) Field of Classification Search
USPC .................................................. 244/54, 53 R
See application file for complete search history.

(56) References Cited

U.S. PATENT DOCUMENTS

| | | | |
|---|---|---|---|
| 2,175,825 A * | 10/1939 | Browne et al. ................. | 248/556 |
| 4,725,019 A * | 2/1988 | White .............................. | 244/54 |
| 5,176,339 A | 1/1993 | Schmidt | |
| 5,181,675 A | 1/1993 | Lardellier et al. | |
| 5,351,930 A | 10/1994 | Gwinn et al. | |
| 5,524,847 A | 6/1996 | Brodell et al. | |
| 5,609,313 A * | 3/1997 | Cole et al. ......................... | 244/54 |
| 5,738,490 A * | 4/1998 | Pizzi .............................. | 415/139 |
| 5,762,472 A * | 6/1998 | Pizzi et al. ..................... | 415/135 |
| 5,775,638 A | 7/1998 | Duesler | |
| 5,806,792 A | 9/1998 | Brossier et al. | |
| 5,988,975 A * | 11/1999 | Pizzi .............................. | 415/139 |
| 6,068,213 A | 5/2000 | Gonidec et al. | |
| 6,296,203 B1 | 10/2001 | Manteiga et al. | |
| 6,494,403 B2 * | 12/2002 | Jule et al. ......................... | 244/54 |
| 6,517,027 B1 | 2/2003 | Abruzzese | |
| 6,609,681 B2 * | 8/2003 | Buder ............................. | 244/54 |
| 6,682,015 B2 * | 1/2004 | Levert et al. .................... | 244/54 |
| 6,708,925 B2 | 3/2004 | Udall | |
| 6,935,591 B2 | 8/2005 | Udall | |
| 7,108,224 B2 * | 9/2006 | Pasquer et al. .................. | 244/54 |
| 7,165,743 B2 | 1/2007 | Pasquer et al. | |
| 7,510,147 B2 | 3/2009 | Haber | |
| 7,566,029 B2 * | 7/2009 | Dron et al. ....................... | 244/54 |
| 7,607,609 B2 * | 10/2009 | Levert ............................. | 244/54 |
| 7,708,224 B2 * | 5/2010 | Aho-Mantila et al. .......... | 244/54 |
| 7,909,285 B2 | 3/2011 | Dron et al. | |
| 7,931,232 B2 * | 4/2011 | Bernardi et al. ................ | 244/54 |
| 7,942,580 B2 * | 5/2011 | Audart-Noel et al. ........ | 384/222 |

(Continued)

*Primary Examiner* — Christopher P Ellis
*Assistant Examiner* — Medhat Badawi
(74) *Attorney, Agent, or Firm* — Norton Rose Fulbright Canada LLP

(57) ABSTRACT

The mounting system can be used in mounting a turbofan gas turbine engine having a nacelle including two halves, each half having a hinged end hingedly connected to the pylon and a free end lockingly engageable with the engine structure. The mounting system can include a primary connection connecting the engine structure to the pylon, and a flexible connection provided between the hinged connections and the pylon, the flexible connection being elastically deformed when a significant force is exerted in a transversal plane upon one of the halves in the closed position.

20 Claims, 9 Drawing Sheets

(56) References Cited

U.S. PATENT DOCUMENTS

| | | |
|---|---|---|
| 7,950,604 B2 * | 5/2011 | Combes et al. ................ 244/54 |
| 8,128,022 B2 * | 3/2012 | Bulin ............................... 244/54 |
| 8,844,861 B2 * | 9/2014 | Balk et al. ....................... 244/54 |
| 2001/0025902 A1 * | 10/2001 | Jule et al. ......................... 244/54 |
| 2003/0025033 A1 * | 2/2003 | Levert et al. .................... 244/54 |
| 2004/0135029 A1 * | 7/2004 | Bansemir et al. ............... 244/54 |
| 2004/0251380 A1 * | 12/2004 | Pasquer et al. .................. 244/54 |
| 2005/0067528 A1 * | 3/2005 | Loewenstein et al. .......... 244/54 |
| 2007/0069068 A1 * | 3/2007 | Lafont et al. .................... 244/54 |
| 2009/0184198 A1 * | 7/2009 | Balk ................................. 244/54 |
| 2009/0200419 A1 * | 8/2009 | Levert et al. .................... 244/54 |
| 2009/0212155 A1 * | 8/2009 | Huggins et al. ................. 244/54 |
| 2009/0266932 A1 * | 10/2009 | Roche et al. .................... 244/54 |
| 2009/0272842 A1 * | 11/2009 | Bulin ............................... 244/54 |
| 2009/0283631 A1 * | 11/2009 | Roche ............................. 244/54 |
| 2010/0163671 A1 | 7/2010 | Svenson et al. |
| 2010/0327110 A1 * | 12/2010 | Caruel et al. .................... 244/54 |
| 2011/0079679 A1 | 4/2011 | Journade et al. |
| 2011/0127367 A1 * | 6/2011 | Ramlaoui et al. ............... 244/54 |
| 2011/0127370 A1 * | 6/2011 | Ramlaoui et al. ............... 244/54 |
| 2011/0168837 A1 | 7/2011 | Balk et al. |
| 2012/0080555 A1 * | 4/2012 | Lafont et al. .................... 244/54 |

\* cited by examiner

MOUNTING SYSTEM FOR MOUNTING ENGINE NACELLE COMPONENTS AND ASSOCIATED METHOD

TECHNICAL FIELD

The application relates generally to gas turbine engines and, more particularly, to mounting engine nacelle components to aircrafts.

BACKGROUND OF THE ART

For safety reasons, aircraft engine powerplants are designed to extremely high standards, and to accommodate even rare situations such as bird strikes or the loss of a blade from one of the high-velocity rotary components such as the fan or compressor (often referred to as a blade-off). In the case of turbofans, the nacelle is often provided in the form of two halves which are hingedly connected at the pylon in a manner to be openable to access the engine therein. The hinges are designed to support the nacelle when it is open for maintenance, the expected mechanical stress during normal engine operation when they are closed, and the mechanical stress which can occur during extreme events. In the past, strengthening the hinges was a way that the loads resulting from an extreme event have been addressed, which inevitably leads to increased weight. Accordingly, there remains room for improvement.

SUMMARY

In one aspect, there is provided a mounting system for mounting a turbofan engine to an aircraft, the turbofan engine having a main rotational axis and an associated transverse axis laterally perpendicular to the main axis, and a nacelle including two annular halves, each half having a hinged end adjacent the pylon and a free end, the system comprising: a pylon; a connection configured for mounting the engine to the pylon and configured to maintain the position of the engine relative to the pylon during operation of the aircraft; at least two hinged connections, each hinged connection being provided between the hinged end of a half and the pylon, the hinges operable to permit closing and opening the halves between open and closed positions; a flexible connection extending between at least one of the hinged connections and the pylon, the flexible connection configured to elastically deform in response to a lateral force exerted on a corresponding half while the halves are in the closed position, the force exceeding a pre-selected threshold, said elastic deformation permitting at least a portion of a corresponding hinged connection to move relative to the engine structure.

In one aspect, there is provided a mounting system for mounting a turbofan gas turbine engine to a pylon of an aircraft, the turbofan gas turbine engine having an engine structure, a main axis and an associated transverse axis, and a nacelle including two halves, each half having a hinged end adjacent the pylon and a free end, the mounting system comprising: a primary connection connecting the engine structure to the pylon and maintaining the position of the engine structure relative to the pylon during operation of the aircraft; two hinged connections, each hinged connection being provided between the hinged end of a corresponding one of the halves and the pylon and operable for selectively closing and opening the halves, the halves being lockingly engageable with the engine structure when in the closed position; a flexible connection provided between the hinged connections and the pylon, the flexible connection being elastically deformeable under a force exerted in a transversal plane upon one of the halves while in the closed position, the force being sufficient for moving at least a portion of a corresponding hinged connection relative to the engine structure.

In a third aspect, there is provided a mounting system for mounting a turbofan gas turbine engine to a pylon of an aircraft, the turbofan gas turbine engine having a core engine with an engine structure, a main axis and an associated radial orientation, and a nacelle including two halves, each half having a hinged end adjacent the pylon and a free end, the mounting system comprising: a primary connection connecting the engine structure to the pylon and maintaining the position of the engine core relative to the pylon during operation of the aircraft; a plurality of pairs of hinges aligned lengthwisely along a corresponding pair of hinge axes, each hinge axis being on a corresponding side of the primary connection; each pair of hinges having a pair of pylon hinge members engaged with a corresponding pair of nacelle hinge members; the plurality of pairs of hinges hingedly connecting a hinged end of the halves to the pylon for selectively closing the halves concentrically around the core engine and opening the halves about the hinge axes, the free end of the halves being lockingly engageable with the engine structure when in the closed position; a flexible connection provided between the halves and the pylon, the flexible connection being elastically deformed when a significant force is exerted in a transversal plane upon one of the halves in the closed position, the significant force thereby moving at least a corresponding hinge relative to the engine structure.

Further details of these and other aspects of the present invention will be apparent from the detailed description and figures included below.

DESCRIPTION OF THE DRAWINGS

Reference is now made to the accompanying figures, in which.

DETAILED DESCRIPTION

Figure 1:
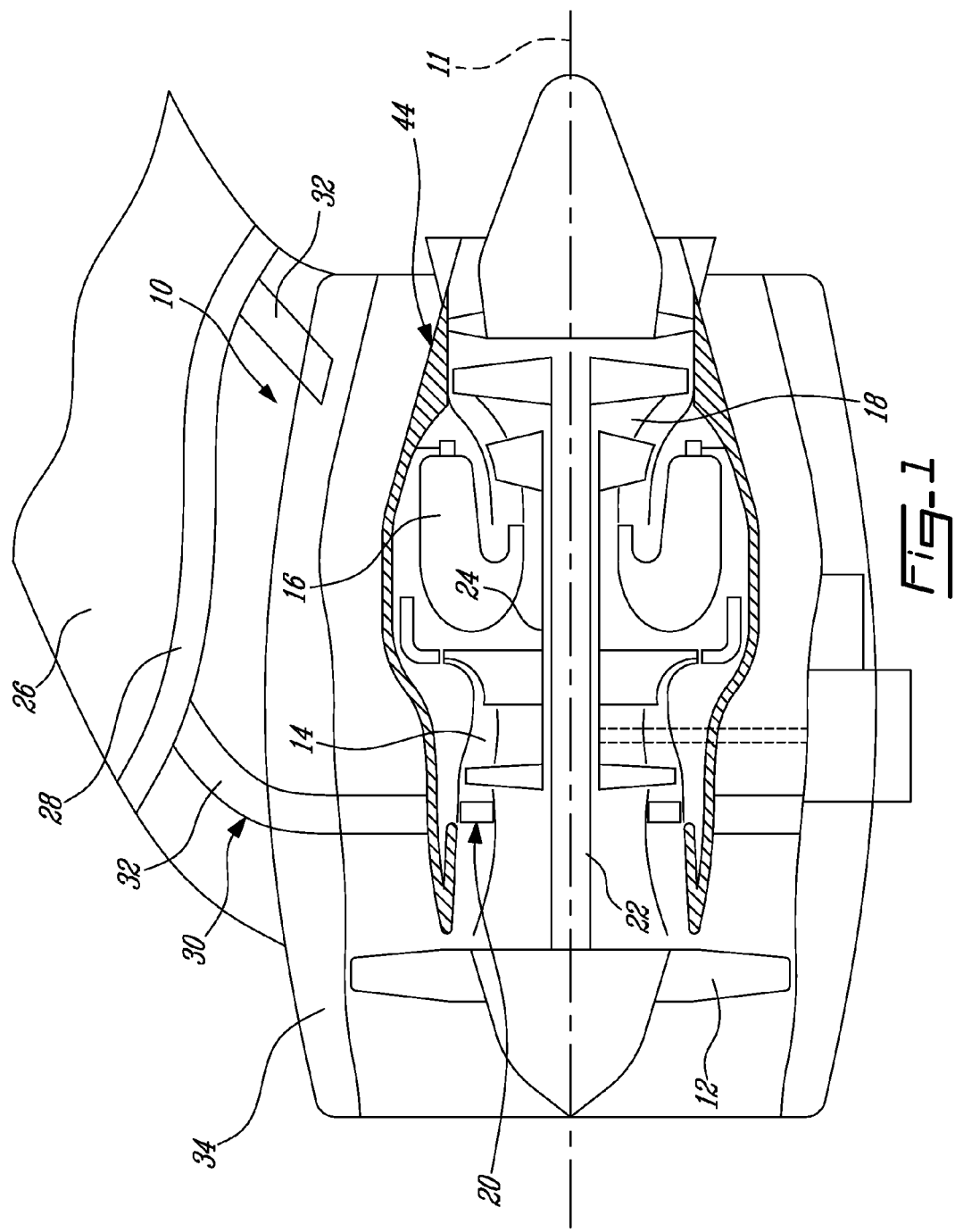
FIG. 1 is a schematic longitudinal cross-sectional view of a gas turbine engine mounted to an aircraft pylon.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Turbofan gas turbine engines have an engine structure 20 by which the rotary shafts 22, 24 are held in respective positions relative the non-rotary components such as stators and casings, and which also holds the non-rotary components in proper positions relative to one another. The engine structure 20 is engineered to withstand all forces which can be expected during operation of the engine. The turbofan gas turbine engine 10 is held in a position relative to a wing of the aircraft via a pylon 26. The engine structure 20 is secured to the pylon 26, and more specifically to a structure 28 of the pylon rather than an aerodynamic skin or the like, via a primary support structure 30 which can include a plurality of main mounts 32, as known by persons of ordinary skill in the art.

Figure 2:
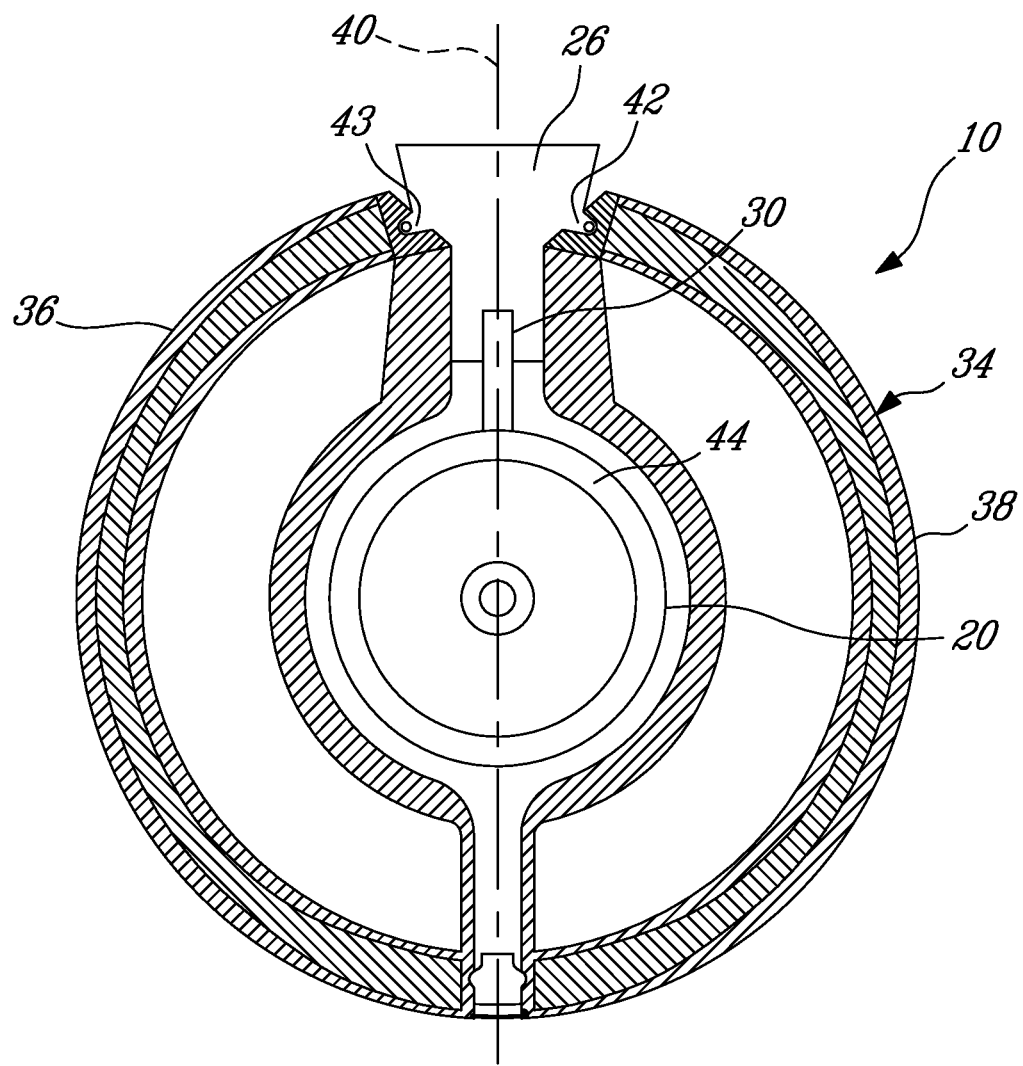
FIG. 2 is a schematic transversal cross-sectional view of a gas turbine engine mounted to an aircraft pylon.

The nacelle is provided in the form of two halves 36, 38, one on each side of a central vertical plane 40, as can be seen in FIG. 2. These halves 36, 38 are often referred to in the art as D-ducts, C-ducts, Fan-duct halves, or Thrust reverser doors when the nacelle includes a thrust reverser, to name a few examples. Each half is hingedly connected to both the pylon and the engine structure via a corresponding hinged connection 42. More specifically, the halves 38, 36 are hingedly mounted to a corresponding side of the pylon 26, in order to be openable upwardly to allow accessing the engine core 44 of the gas turbine engine 10 for maintenance and the like. The halves 36, 38 are pivoted downwardly to prepare the engine for use, where they can engage a portion of the engine structure for support, often with mating V-grooves or the like such as illustrated. In this example, the two halves are latched to one another with the engaging portion of the engine structure trapped therebetween during use, thus effectively lockingly engaging the free end of the halves with the engine structure during use.

Figure 3:
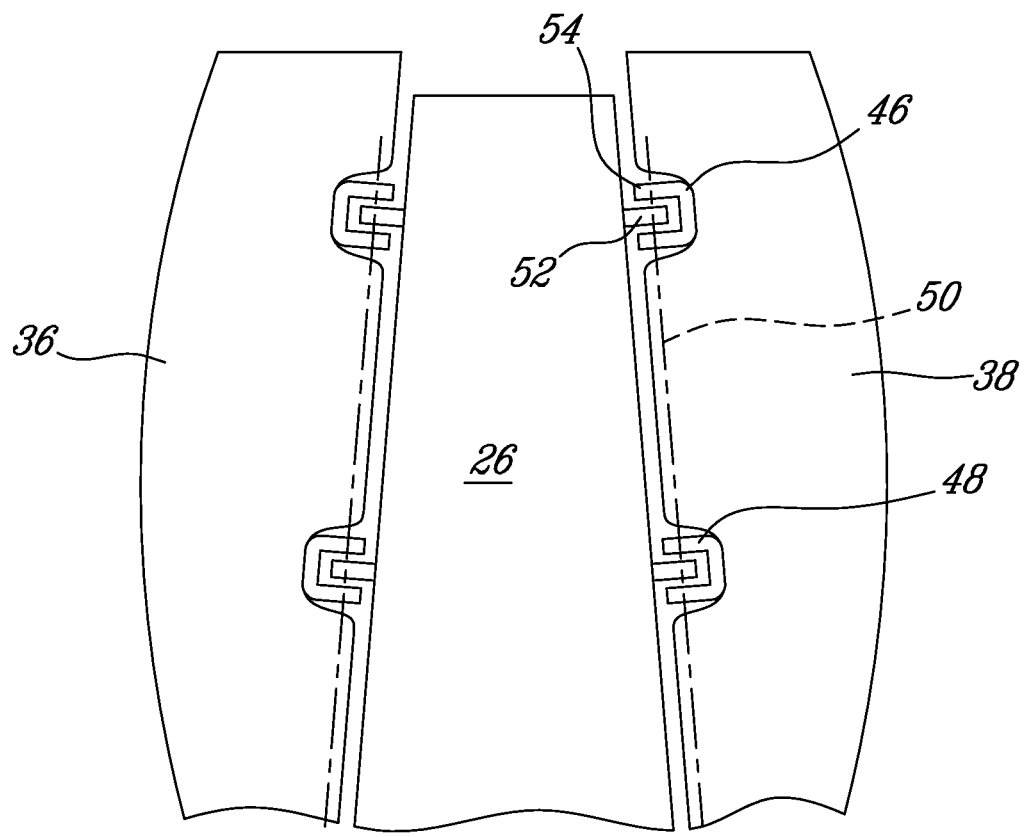
FIG. 3 is a top plan view of a gas turbine engine mounted to an aircraft pylon.

The hinged connections 42, 43 can include a plurality of pairs of hinge units 46, 48 aligned with one another along a corresponding pair of hinge axes 50, each hinge axis being oriented generally along the length of the engine and pylon 26. Each hinge unit 46, 48 can include a pylon hinge member 52 pivotally engaged with a nacelle hinge member 54 for relative pivoting. An example configuration including both a rear pair of hinge units and a forward pair of hinge units is shown in FIG. 3. Alternate examples can have three, four, or more pairs of hinge units depending on the specificities of the application and designer choice.

Collectively, the hinged units are designed to support the weight of a corresponding to a nacelle half when the half is in the open configuration or moved between the open and closed configurations. During operation of the gas turbine engine 10, the hinged connections 42, 43 are also used, in combination with the engine structure 20 trapped between the free ends of the nacelle halves 36, 38, to hold the halves 36, 38 in position relative to each other and relative to the engine core 44. Accordingly, at least two of the pairs of hinge units 46, 48 are typically designed with a snug engagement between their hinge members 52, 54. In some embodiments, particularly in cases with more than two pairs of hinge units, one or more of the pairs of hinges can be designed to remain loosely engaged during operation of the gas turbine engine, with one or more others of the pairs of hinges maintaining the relative position of the nacelle halves more tightly.

The design process of gas turbine engines is typically assisted by computer-assisted simulation. Computer-assisted simulation can be used to simulate an extreme operating condition such as a fan blade-off scenario. Such stresses tend to occur particularly in the hinge pair or hinge pairs closest to the blade-off location. Using the pairs of hinges to withstand the extreme stresses which can occur during a fan blade-off scenario can allow to avoid using an additional structure to do so. However, designing the pairs of hinges to withstand such extreme stresses typically led to oversizing the pairs of hinges, which led to added weight as a trade-off. In computer-assisted simulation, the totality of connections between the gas turbine engine (including the nacelle) and the pylon are a statically non-determined set, the analytically calculated blade-off hinge loads are used as sizing loads in the design of the nacelle and the pylon structure and therefore the weight of these structures increases with the said hinge loads, which can form a vicious circle attracting even greater loads in the hinges.

By contrast, the mounting structure described herein uses a flexible connection which can allow flexibility between the hinge units of at least one of the hinge unit pairs and the primary support structure of the engine. The flexible connection can be used at the pair of hinges closest to the fan, or otherwise determined to be most likely affected in an extreme scenario for instance, and optionally used at more than one hinge unit pair. This elasticity can be either permanent, or released only after a certain hinge load is exceeded which can be achieved by using a stiffer fuse attachment which collapses (e.g. shears) at a certain design load (structurally fused connection).

The flexible connection can be clearly defined by contrast with the primary support structure which connects the engine structure to the pylon. More specifically, understanding that the flexible connection is designed to allow a pair of hinge units, to accommodate for extreme forces exerted on the nacelle in the transversal plane, a satisfactory flexibility can be defined to correspond to allowing a yielding displacement five times greater of either one of the associated mating hinge members than the corresponding movement of the engine structure for a same extreme force in the transversal plane. Such an amount of displacement can be considered to effectively 'decouple' the stress at the hinge from the stress in the engine structure in the context described above.

Figure 4:
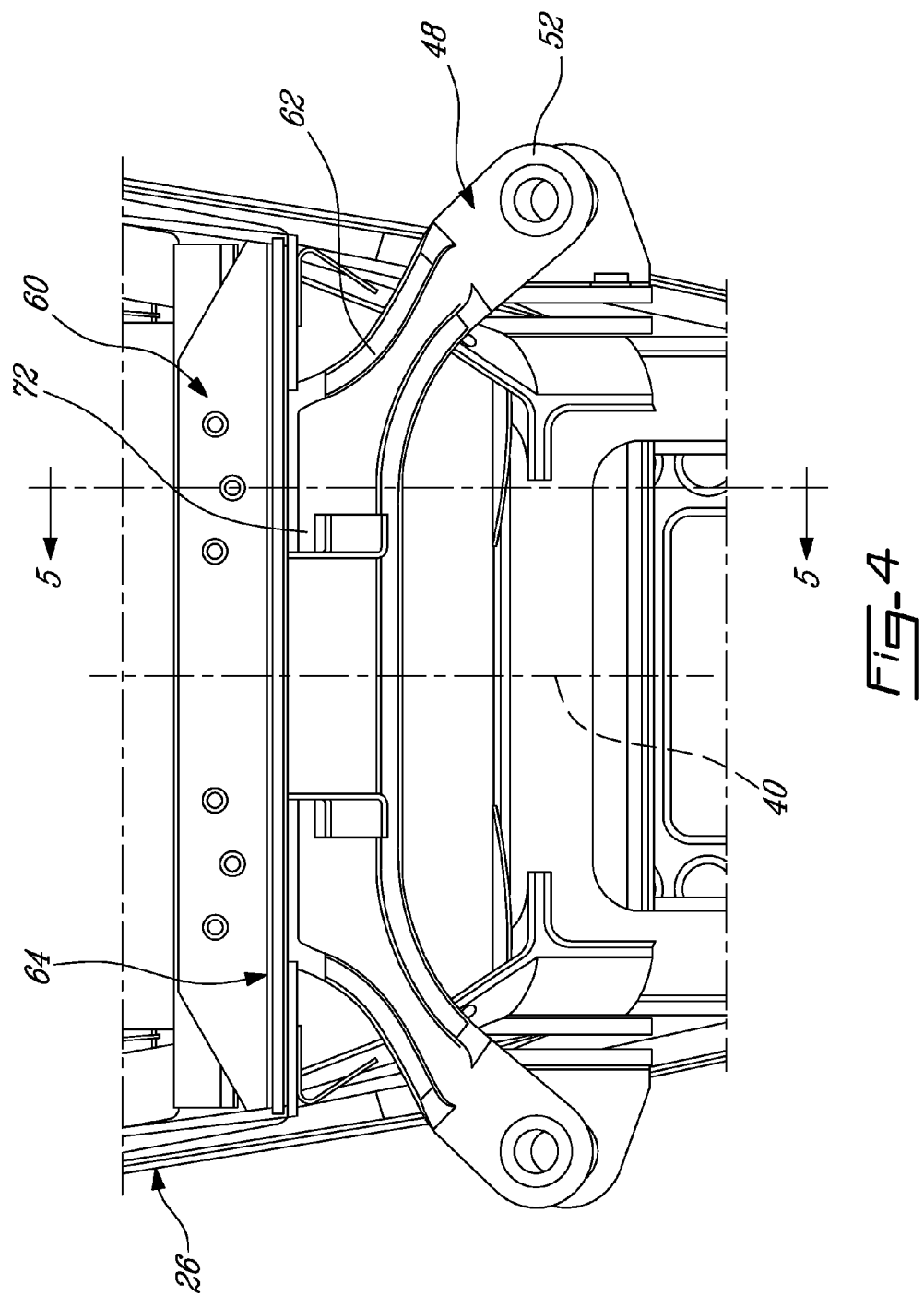
FIG. 4 is a front elevation view showing an example of a flexible connection.

FIG. 4 shows an example of a flexible connection 60. More specifically, in this example, the flexible connection 60 is provided for the given pair of hinge units 48 axially closest to the fan 12. The pylon hinge members 52 are provided at two opposite ends of a transverse beam 62. The transverse beam 62 is mounted to a flexible floor 64 of the pylon 26, which, in turn, is mounted to a structure 66 of the pylon 26, rather than being mounted directly to the structure 66 of the pylon 26, forming a flexible connection 60. More specifically, referring also to FIG. 5, the floor 64 of the pylon 26 in this embodiment is made from sheet metal having a relatively thin gauge. The metal sheets are upturned to form flanges 68, 70 which are fastened in abutment against the front and back face of an upward-protruding portion 72 of the transverse beam 62. The fasteners 74 are positioned a certain distance upwardly from the pylon floor 64. Accordingly, each transversal side of the upward-protruding portion 72 of the transverse beam 62 can be moved upwardly or downwardly as the corresponding portion of the floor elastically yields to a corresponding upward or downward force exerted on a corresponding one of the halves and transferred to the flexible connection via a corresponding hinge unit, leading to movement of the corresponding hinge unit. In this embodiment, since both sides of the flexible connection 60 allow both upward and downward liberty of movement, torsion stress around an axis parallel to the main axis 11 of the engine can also be accomodated.

Figure 5:
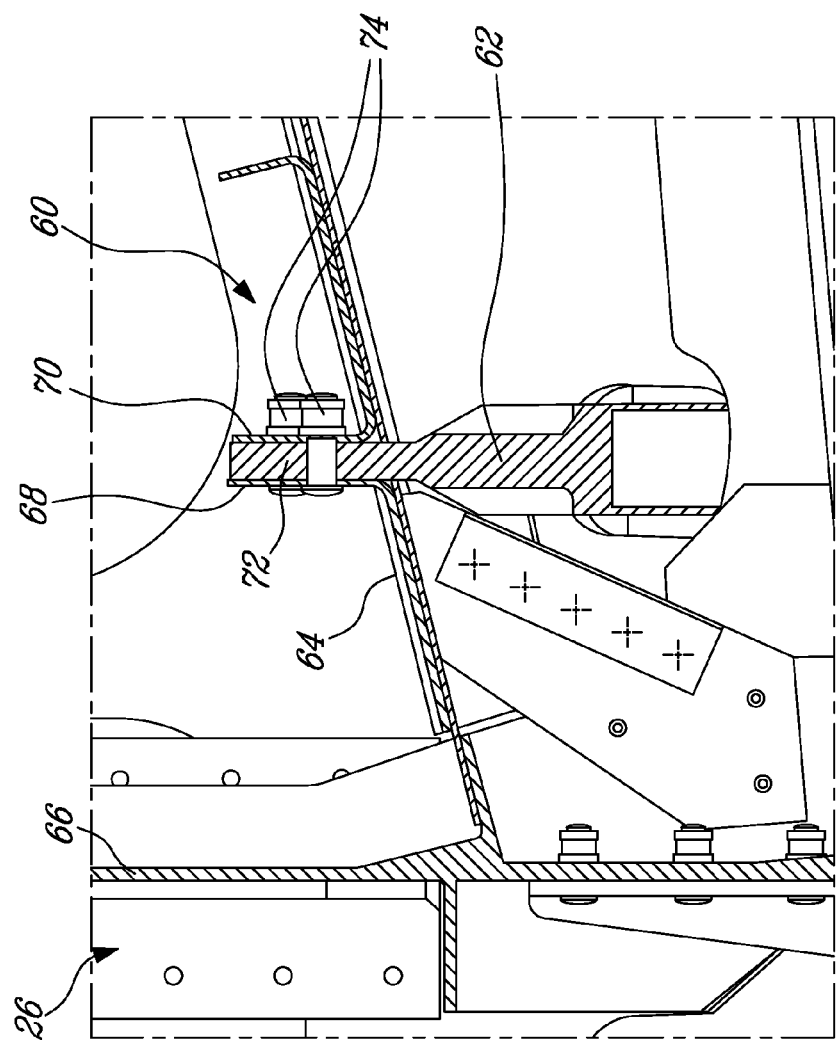
FIG. 5 is a a cross-sectional view taken along lines W W of FIG. 4.
Figure 6A:
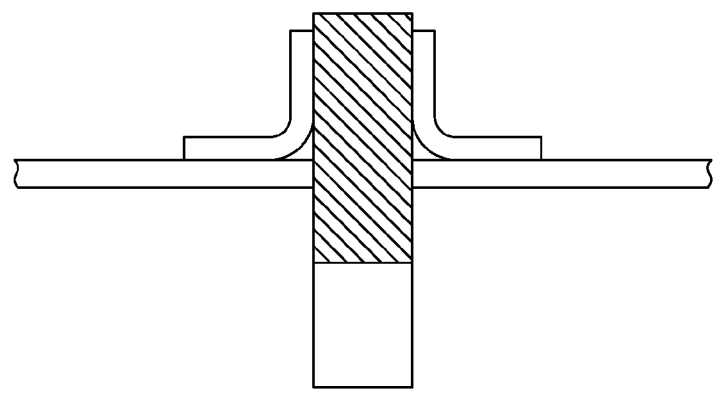
FIGS. 6A, 6B and 6C schematic views showing variants of the example shown in FIG. 5.
Figure 6B:
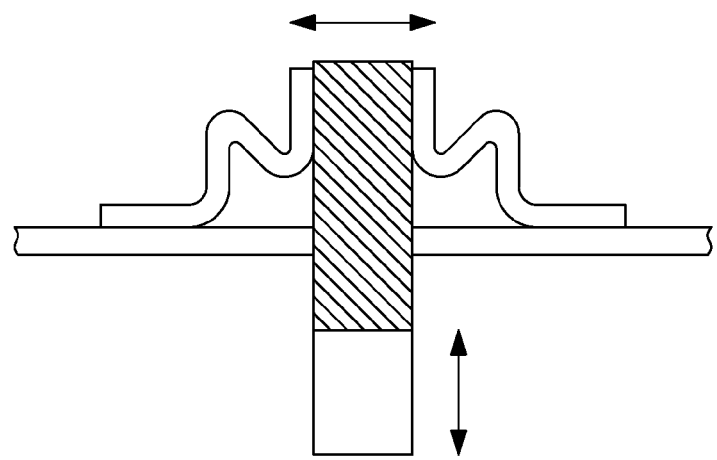
Figure 6C:
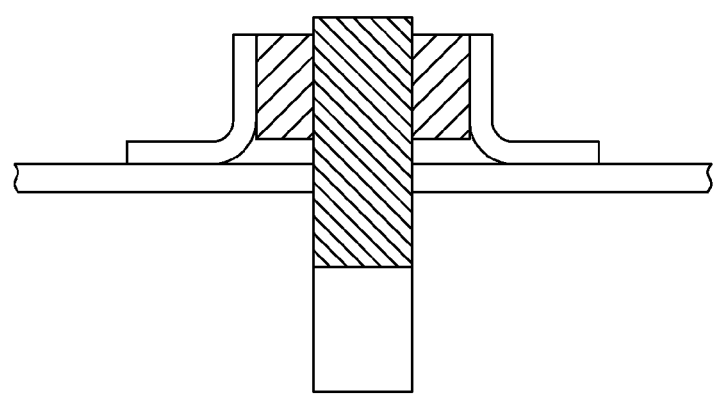

A simplified sketch of the approach illustrated in FIGS. 4 and 5 is illustrated at FIG. 6A. FIG. 6B shows a variant where rather than being conferred only by the flexibility of the pylon floor, flexibility is also conferred by way of flexible members provided in the form of spring-shaped flexible brackets. FIG.

6C shows another variant where flexibility is also conferred by way of flexible members made of an elastomeric material and interposed between the transverse beam and the pylon floor.

It will be understood that using the teachings of this disclosure, the flexibility can be specifically tailored in view of specific embodiments, or according to results of computer assisted simulation.

Figure 7A:
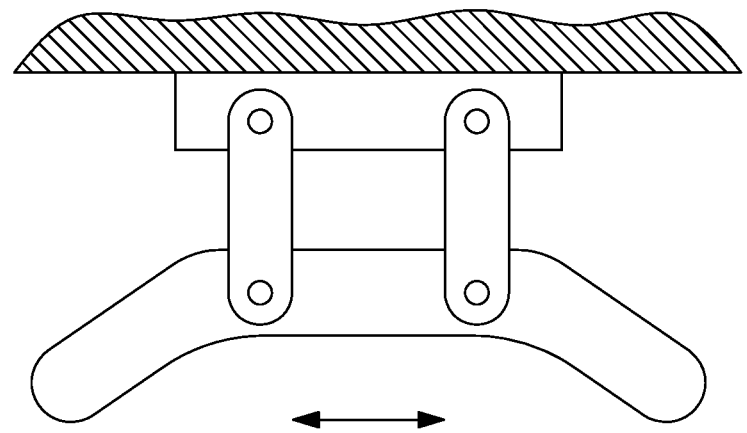
FIGS. 7A and 7B are schematic views showing other examples of a flexible connection.
Figure 7B:
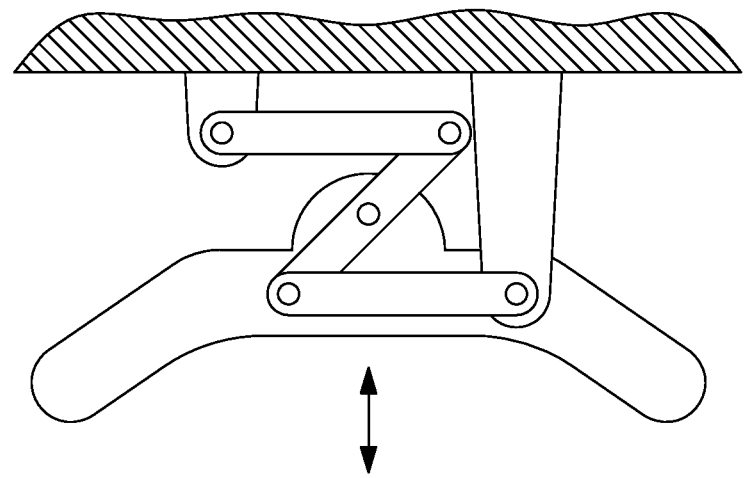

FIG. 7A shows a simplified sketch of still another variant where the flexible connection is provided in the form of a plurality of linkages provided between a transverse beam and the pylon structure. FIG. 7B shows a simplified sketch of still another variant, also using linkages, but where the linkages are arranged according to a Watts linkage. It will be understood that more than one means of providing a flexible connection can be combined in some embodiments.

Figure 8A:
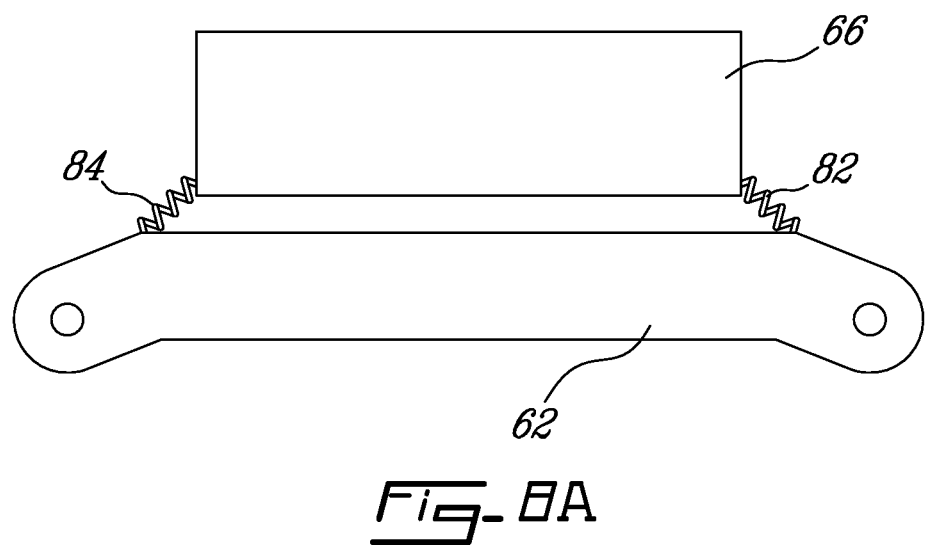
FIGS. 8A and 8B are schematic views showing other examples of a flexible connection.
Figure 8B:
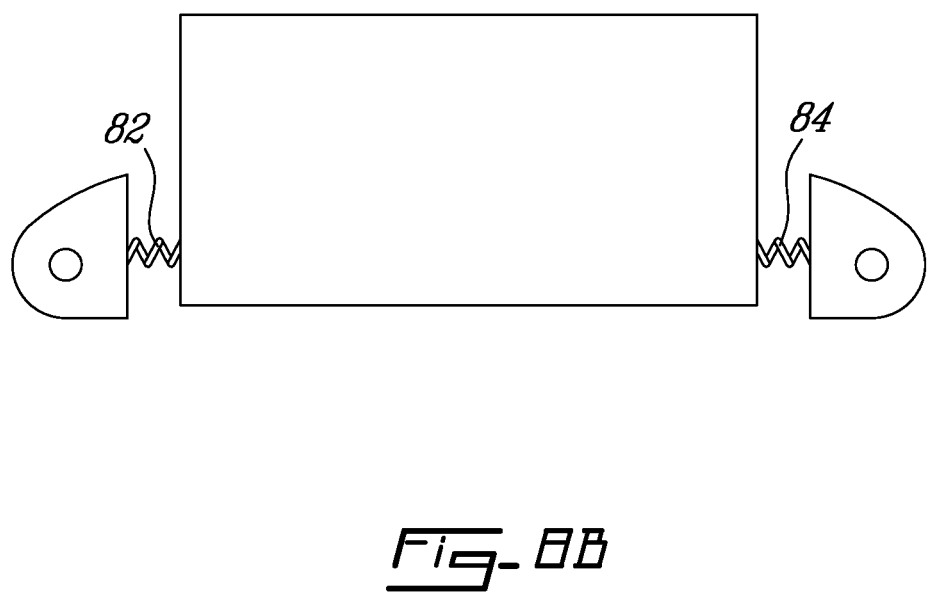

FIG. 8A shows a simplified sketch illustrating an embodiment where the flexible connection is provided in the form of two flexible members 82, 84 provided between the pylon structure 66 and a transverse beam connecting the halves. The flexible members 82, 84 can be springs, elastomers, the floor of the pylon as shown in FIGS. 4 and 5, or linkages such as shown in FIG. 7A or 7B to name a few examples. In FIG. 8B, flexible members 82, 84 are also used, however they are configured to provide independent flexibility to each one of the hinge units of the hinge unit pair, with each flexible member being provided between a corresponding one of the halves and the pylon primary connection.

Figure 9A:
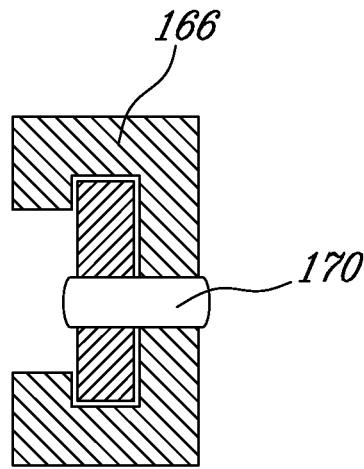
FIG. 9 includes cross-sections 9A and 9B and shows an example of a fused connection.
Figure 9B:
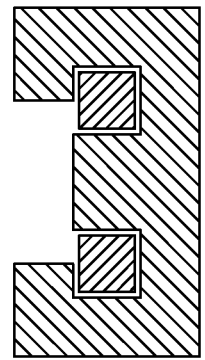
Figure 9C:
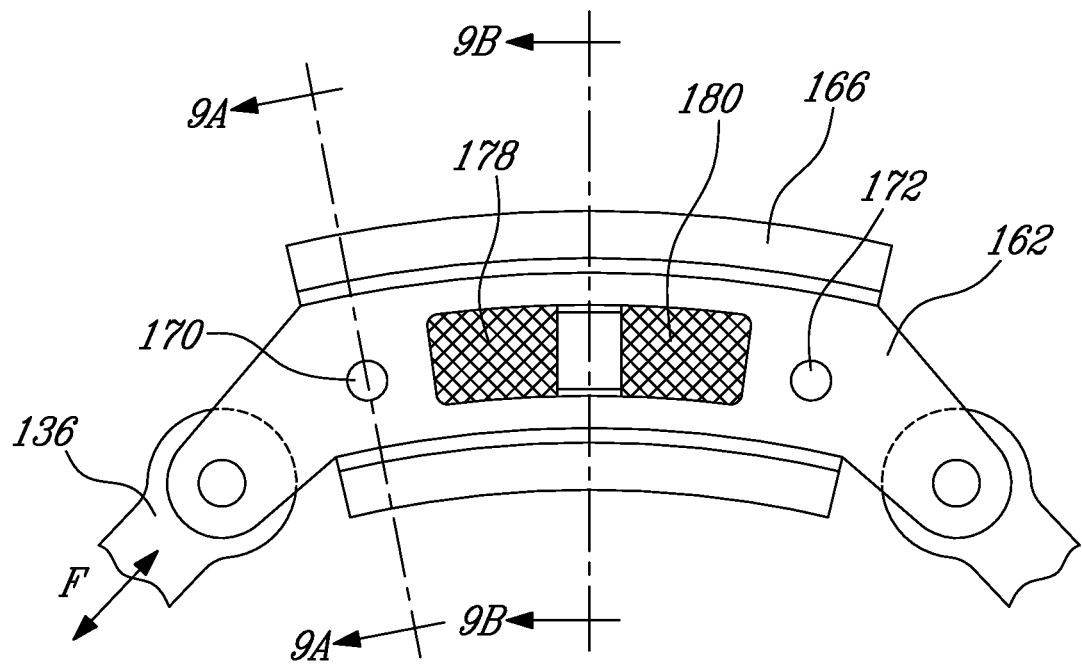

FIG. 9 shows an example of a fused connection embodiment in which halves 136 are hingedly connected at opposite ends of a transverse beam 162 which, itself, is received in a pylon primary connection 166. The transverse beam 162 is typically rigidly prevented, by shear pins 170, 172, from sliding transversally in the pylon primary connection 166 upon application of a tangential force F applied to the half. The shear pins act as a fused connection between the transverse beam 162 and the pylon primary connection 166. If the force F exceeds a predetermined threshold, the shear pins break and the rigid connection by the shear pins 170, 172 is converted into a flexible connection provided by way of resilient elements 178, 180 such as elastomers or springs, allowing the transverse beam to slide transversally in the pylon primary connection 166 to a certain extent determined by the resilience of the resilient elements 178, 180. The flexible connection allows a distance of displacement which is at least five times that of a similar force acting in a similar direction at the closest engine mount.

The above description is meant to be exemplary only, and one skilled in the art will recognize that changes may be made to the embodiments described without departing from the scope of the invention disclosed. For example, nacelle halves can have other functions than simply directing a bypass flow (e.g. reverse flow, inlet), and the flexible connection can be applied to many suitable forms of nacelle halves. Also, a flexible connection can be provided to only one, some, or all of the hinge units—for instance, in an embodiment having four hinge units forming each hinged connection, the hinge units of two of the hinge unit pairs can be floating during use of the aircraft, with the hinge units of only one or both of the remaining hinge unit pairs being provided with a flexible connection. Still other modifications which fall within the scope of the present invention will be apparent to those skilled in the art, in light of a review of this disclosure, and such modifications are intended to fall within the scope of the appended claims.

What is claimed is:

1. A mounting system for mounting a turbofan engine to an aircraft, the turbofan engine having a main rotational axis and an associated transverse axis laterally perpendicular to the main axis, and a nacelle including two annular halves, each half having a hinged end adjacent the pylon and a free end, the system comprising:
a pylon;
a connection configured for mounting the engine to the pylon and configured to maintain the position of the engine relative to the pylon during operation of the aircraft;
at least two hinged connections, each hinged connection being provided between the hinged end of a half and the pylon, the hinges operable to permit closing and opening the halves between open and closed positions;
a flexible connection extending between at least one of the hinged connections and the pylon, the flexible connection configured to elastically deform in response to a lateral force exerted on a corresponding half while the halves are in the closed position, the force exceeding a pre-selected threshold, said elastic deformation permitting at least a portion of a corresponding hinged connection to move relative to the engine structure.

2. The mounting system of claim 1 wherein the flexible connection extends between each one of the at least two hinged connections and the pylon and is in a transversal plane coinciding with or adjacent a fan of the turbofan gas turbine engine.

3. The mounting system of claim 1 wherein the hinged connections include a plurality of hinge unit pairs, each hinge unit including a pylon hinge member engaged with a corresponding duct hinge member, the hinge units of each pair are aligned lengthwisely with one another along a corresponding hinge axis, and the flexible connection is associated to at least one of the hinge unit pairs.

4. The mounting system of claim 3 wherein the flexible connection includes two flexible members, each one of the two flexible members being associated with a corresponding hinge unit of one of the hinge unit pairs.

5. The mounting system of claim 4 wherein the flexible members each independently connect a corresponding pylon hinge member to a structure of the pylon.

6. The mounting system of claim 3 wherein at least one of the hinge unit pairs has the corresponding pylon hinge members provided at corresponding ends of a transverse beam, the transverse beam being connected to a structure of the pylon via the flexible connection.

7. The mounting system of claim 6 wherein the transverse beam is mounted to a sheet-metal floor of the pylon, the sheet-metal floor of the pylon being connected to the pylon structure.

8. The mounting system of claim 7 wherein the flexible connection is provided at least partially by way of a flexibility of the sheet-metal floor of the pylon.

9. The mounting system of claim 6 wherein the flexible connection includes a flexible member on each side and associated with each hinge unit of the at least one hinge unit pair.

10. The mounting system of claim 9 wherein the flexible members include at least one flexible sheet metal component.

11. The mounting system of claim 10 wherein the flexible members are provided in the form of sheet metal brackets.

12. The mounting system of claim 9 wherein the flexible members include at least one elastomeric member made of elastomeric material.

13. The mounting system of claim 6 wherein the flexible connection includes linkages.

14. The mounting system of claim 1 further comprising at least one structural fuse connection member structurally resistant to forces up to a significant force threshold to bypass the flexible connection, and breaking when subjected to the significant force at or above the significant force threshold to allow said movement of the hinge.

15. The mounting system of claim 1 wherein the primary connection includes at least two main engine mounts, and wherein the hinged connection movement corresponds to at least five times a corresponding movement of any one of the main engine mounts for a same significant force.

16. A method of managing a significant force event on a gas turbine engine supported by a pylon of an operating aircraft, the turbofan gas turbine engine having a core engine with an engine structure, a main axis and an associated radial orientation, a primary connection connecting the engine structure to the pylon and maintaining the position of the engine structure relative to the pylon; a nacelle including two halves, each half having a hinged end adjacent the pylon and a free end; and two hinged connections, each hinged connection being provided between the hinged end of a corresponding one of the halves and the pylon and operable for selectively closing the halves concentrically around the core engine and opening the halves, the halves being lockingly engageable with the engine structure when in the closed position; the significant force being exerted in a transversal plane and exerted upon one of the halves in the closed position; the method comprising:

transferring the significant force to a flexible connection provided between the corresponding half and the pylon, thereby elastically deforming the flexible connection and moving a corresponding hinge relative to the engine structure.

17. The method of claim 16 wherein the flexible connection is in a transversal plane near a fan of the turbofan gas turbine engine.

18. The method of claim 16 wherein the step of transferring the significant force includes breaking at least one structural fuse connection member structurally resistant to forces of a magnitude up to a predetermined significant force threshold.

19. The method of claim 16 wherein the moving includes moving the corresponding hinge by a distance at least five times a corresponding distance of movement of the engine structure.

20. A mounting system for mounting a turbofan gas turbine engine to a pylon of an aircraft, the turbofan gas turbine engine having a core engine with an engine structure, a main axis and an associated transverse axis, and a nacelle including two halves, each half having a hinged end adjacent the pylon and a free end, the mounting system comprising:

a primary connection connecting the engine structure to the pylon and maintaining the position of the engine core relative to the pylon during operation of the aircraft;

a plurality of pairs of hinges aligned lengthwisely along a corresponding pair of hinge axes, each hinge axis being on a corresponding side of the primary connection; each pair of hinges having a pair of pylon hinge members engaged with a corresponding pair of nacelle hinge members; the plurality of pairs of hinges hingedly connecting a hinged end of the halves to the pylon for selectively closing the halves concentrically around the core engine and opening the halves about the hinge axes, the free end of the halves being lockingly engageable with the engine structure when in the closed position;

a flexible connection provided between the halves and the pylon, the flexible connection being elastically deformed when a significant force is exerted in a transversal plane upon one of the halves in the closed position, the significant force thereby moving at least a corresponding hinge relative to the engine structure.

\* \* \* \* \*